(12) United States Patent
Dirscherl et al.

(10) Patent No.: US 11,260,484 B2
(45) Date of Patent: Mar. 1, 2022

(54) TOOL DRIVE HAVING A SPINDLE SHAFT AND OPERATING METHOD

(71) Applicant: KEBA Industrial Automation Germany GmbH, Lahnau (DE)

(72) Inventors: Markus Dirscherl, Wasserburg (DE); Johannes Von Löwis, Lahnau (DE)

(73) Assignee: KEBA Industrial Automation Germany GmbH, Lahnau (DE)

( * ) Notice: Subject to any disclaimer, the term of this patent is extended or adjusted under 35 U.S.C. 154(b) by 0 days.

(21) Appl. No.: 16/785,582

(22) Filed: Feb. 8, 2020

(65) Prior Publication Data

US 2020/0189052 A1 Jun. 18, 2020

Related U.S. Application Data

(62) Division of application No. 15/564,747, filed as application No. PCT/EP2016/057759 on Apr. 8, 2016, now Pat. No. 10,744,606.

(30) Foreign Application Priority Data

Apr. 8, 2015 (DE) ...................... 10 2015 105 338.1

(51) Int. Cl.
*B23Q 1/70* (2006.01)
*B23Q 15/00* (2006.01)
(Continued)

(52) U.S. Cl.
CPC ................ *B23Q 1/70* (2013.01); *B23B 47/34* (2013.01); *B23Q 1/4828* (2013.01); *B23Q 5/32* (2013.01);
(Continued)

(58) Field of Classification Search
CPC .. Y10T 408/23; Y10T 408/675; Y10S 408/70; B23B 47/34; B23B 29/125;
(Continued)

(56) References Cited

U.S. PATENT DOCUMENTS 4,180,946 A * 1/1980 Heijkenskjold .......... B23Q 5/10
310/90.5
5,006,021 A * 4/1991 Wheetley ........... B23Q 11/1038
408/1 R
(Continued)

FOREIGN PATENT DOCUMENTS

WO WO-2013142890 A1 * 10/2013 ........... B23B 29/125

OTHER PUBLICATIONS

Machine Translation, WO2013142890A1. (Year: 2013).*

*Primary Examiner* — Chwen-Wei Su
(74) *Attorney, Agent, or Firm* — WRB-IP LLP

(57) ABSTRACT

A tool drive with spindle shaft for a chip-forming machining includes at least one electromagnetic axial actuator and a control and/or regulation apparatus for the operation of the axial actuator for changing the position of the spindle shaft along the longitudinal axis, wherein the control and/or regulation apparatus is designed to drive the axial actuator for the generation of microvibration movement of the spindle shaft, independently of and superimposable on a feed movement, in order to affect the chip size and chip shape of the removed material, wherein at least one axial magnetic bearing and/or one linear motor is provided as at least part of the axial actuator, wherein the regulation and/or control apparatus includes a memory unit and/or a function generation unit, and is configured to specify setpoint values of the oscillation curve of the microvibration movement depending on geometrical and or physical data of the workpiece and/or process variables that are measured or determined indirectly and/or control inputs, so that the control and/or regulation apparatus is configured to adjust an axial microvibration movement of the spindle shaft, independently of and superimposed on a feed movement, in such
(Continued)

a way as to affect the chip size and chip shape of the removed material created when drilling.

14 Claims, 7 Drawing Sheets

(51) Int. Cl.
| | |
|---|---|
| *B23B 47/34* | (2006.01) |
| *B23Q 1/48* | (2006.01) |
| *B23Q 5/32* | (2006.01) |
| *B23Q 11/10* | (2006.01) |
| *B23B 39/10* | (2006.01) |

(52) U.S. Cl.
CPC .......... *B23Q 11/1015* (2013.01); *B23B 39/10* (2013.01); *Y10T 408/23* (2015.01); *Y10T 408/675* (2015.01)

(58) Field of Classification Search
CPC ................ B23B 39/10; B23B 2260/10; B23B 2260/102; B23B 2260/0625; B23B 2260/66; B23B 2270/38; B23B 2270/10; B23B 37/00; B23Q 1/34; B23Q 1/70; B23Q 1/4828; B23Q 2005/005; B23Q 5/32; B23Q 5/10; B23Q 11/1015; B23Q 15/00; B23Q 15/007; B23Q 15/013; B23Q 15/12; B23Q 15/14; B23Q 15/16; B23Q 15/18
See application file for complete search history.

(56) References Cited

U.S. PATENT DOCUMENTS

| | | | |
|---|---|---|---|
| 5,669,636 A * | 9/1997 | Kubala | B23Q 11/1015 285/281 |
| 8,047,104 B2 * | 11/2011 | Imai | B23B 1/00 82/1.11 |
| 8,694,133 B2 * | 4/2014 | Mann | B23Q 15/12 700/56 |
| 8,926,235 B2 * | 1/2015 | Moraru | B23B 37/00 408/17 |
| 2013/0257206 A1 * | 10/2013 | Lee | F16C 25/086 310/90.5 |

* cited by examiner

TOOL DRIVE HAVING A SPINDLE SHAFT AND OPERATING METHOD

The present application is a divisional of U.S. patent application Ser. No. 15/564,747, filed Oct. 6, 2017, which is the U.S. National Stage of PCT/EP2016/057759, filed Apr. 8, 2016, which claims priority to DE 10 2015 105338.1, filed Apr. 8, 2015.

BACKGROUND AND SUMMARY

The present invention relates to a tool drive with spindle shaft and an operating method for the chip-forming machining of workpieces.

The first work in the field of microvibration chip-forming machining was started in the 1950s by Ptr. V. N. Poduraev at the Bauman University in Moscow. One of its main principles is that of generating axial vibrations or oscillations in addition to the feed movement of the drill in order to achieve drilling chips of the smallest possible size which could easily be removed from the cutting region.

Two spindle shaft systems were initially employed, so-called self-oscillating spindle systems and spindle systems with external excitation of oscillations.

In the case of the self-oscillating spindle systems, the natural frequency of the tool is used in order to generate resonant vibrations and thus to shatter the drilling chips and granulate them into small pieces. The oscillation frequency is determined by the mass-spring system of the spindle shaft, with the tool holder including the drilling tool.

Actively driven piezoelectric systems for the generation and control of overlaid vibrations are also used—see, for example, DE 10 2009 027 688 A1. These systems exhibit high oscillation frequencies of up to 2 kHz or significantly higher for the smallest possible sizes of drilling chips, between a few millimetres down to micrometres. These are particularly suitable for drilling small holes.

DE 103 43 682 A1 proposes a tool system with mechanical bearings with an additive linear drive that comprises a piezoelectric or magnetically operating actuator which can generate a microvibration movement on the longitudinal axis with a frequency ω. The generation of the microvibration oscillation is aligned in an axial direction, and is effected by a magnetic actuator, which is inserted in the mechanical clamping system, provided in addition to the mechanical bearing and clamping that are already present. DE 103 43 682 A1 thus teaches a hollow shank taper tool clamping system with mechanical bearings, in which an actuator is retrospectively mounted at the end of the spindle shaft in the tool receptacle, and provides neither an indication of an adaptive adjustment of vibration frequencies or amplitudes depending on the materials used, nor of an active axial magnetic bearing. A disadvantage of this solution is, furthermore, that the energy necessary to generate the oscillation must, with difficulty, be introduced through slip rings or the like.

At the same time, vibrations can be generated through known mechanical systems which are, for example, employed in usual impact drill machines. The impact frequency is fixed by a combination of the speed of rotation and the number of oscillations per rotation, and amounts to only a few oscillations per rotation, whereby small chip forms and chip sizes are achievable.

The SineHoling® technology from the French firm of MITIS should be mentioned in relation to mechanically driven active generation of vibratory oscillations, as is explained, for example, in US 2013 0051946A1. High-frequency axial vibrations can be overlaid onto a spindle shaft through a relatively complex mechanical gear.

The construction and use of axial and radial magnetic bearings for fast-rotating shafts, such as for vacuum pumps, have been known for a long time. Various designs of axial and radial magnetic bearings are illustrated, for example, in the book "Magnetlager: Grundlagen, Eigenschaften und Anwendungen Berührungsfreier, Elektromagnetischer Lager" by Gerhard Schweitzer, Springer Verlag Taschenbuch published 27 Apr. 1993 (ISBN-13: 978-3662084496).

In the field of deep hole drilling in particular, the significant advantages of vibration machining, in particular of vibration drilling and vibration milling, wherein chips can be removed from the drilled hole practically without residue and the temperature of the tool workpiece can be lowered, were shown. In particular, these aspects are of significant advantage when drilling without the use of lubricant, i.e. in the dry-drilling method, and for applications in which workpieces with a material matrix, such as composite material workpieces found in the aircraft industry, must be drilled. When drilling through composite materials and bonded materials, drilling chips of different sizes result, depending on the material present at the drilling head. When drilling through workpieces, burring is formed as the material is forced along the periphery of the inlet and outlet holes, wherein the height and extent of the burring depends on the feed rate, and can be influenced through applying vibration to a drilling tool.

Disadvantageous to the above method are a low ability to control the introduction of the vibration and to monitor the machining process, the fact that the solutions are complex in construction and wasteful of space, as well as the decreased efficiency of the drilling.

Shafts and spindles with magnetic bearings are, furthermore, known from the prior art, for example from DE 10 2005 030 724 A1, and are preferably employed in the field of high-frequency rotating drives for turbomolecular pumps, compressors and the like.

Drilling spindle shafts with magnetic bearings which can effect an axial alignment of the spindle axis and an axial feed by means of a drive to the coils of the magnetic bearings that generate the magnetic fields are known from DE 20 2007 010 866 U1 and DE 10 2006 036 004 A1. The drive of the magnetic bearings serves for quasi-static alignment of the spindle in the tool process, which does not affect the chip-forming process in itself, only an alignment of the spindle axis being affected. In detail, DE 10 2006 036 004 A concerns a tool drive with both axially and radially arranged magnetic bearings whose purpose is to be able to achieve axial and radial pivoting movements through drive to the magnetic bearings, in order to control the material machining. There is no indication here of the support to the forward drilling drive as such during the progress of the drilling through overlaid movements, in particular microvibration oscillations.

A drive method for the drive of a tool drive which performs a modulation of the amplitude of the feed in order to enable an improved cutting machining is presented in U.S. Pat. No. 8,694,133 B2 and U.S. Pat. No. 7,587,965 B2. It is taught here that a control method with a control loop is provided, wherein various influencing factors such as a distance measurement, a force measurement, an acceleration measurement, a temperature measurement, a current or power measurement, an image processing or a digital optical displacement transducer are employed in order to achieve an optimization of a feed power and a vibration frequency in the axial direction.

Documents DE 34 21 973 A1, DE 1 020 050 51 909 C5, DE 20 2007 010 866 U1 and AT 513 094 B1, which are of the same general type, concern construction designs of tool drives subjected to vibrations in which ultrasonically vibrating axial actuators or radially controllable magnetic bearings are employed in order to affect the chip-forming machining process.

Based on the above-mentioned prior art, it is desirable to propose an improved method for optimized, chip-forming machining.

In a first inventive aspect, a tool drive with spindle shaft for a chip-forming machining, comprising at least one electromagnetic axial actuator and a control and/or regulation apparatus for the operation of the axial actuator for changing the position of the spindle shaft on the longitudinal axis is proposed, in which the control and/or regulation apparatus is designed to drive the axial actuator for the generation of microvibration movement of the spindle shaft, independently of and superimposable on a feed movement, in order to affect the chip size and chip shape of the removed material. The electromagnetic axial actuator can generate axial microvibration movements of the spindle shaft through a changeable drive of the control and/or regulation apparatus, in order to affect the chip formation, in particular to generate small-sized, easily removed chips. An adaptation of an axial vibratory oscillation of the spindle shaft can be achieved in this way in order to remain appropriate for changed chip-forming machining process parameters such as, for example, a wear of the tool, tool and workpiece temperature, varying types of material, complex workpiece structure such as composite materials etc. This can be achieved through a controlled and changeable influencing of the current for drive of the electromagnetic axial actuator that affects an axial position of the spindle shaft.

The tool drive comprises a control and/or regulation apparatus that is designed to generate the microvibration movement and that can control and regulate further tasks such as for example the feed of the tool, a drive motor control, and further process parameters of the chip-forming machine. For this purpose the drive can comprise further sensors and actuators, in particular a drive motor of the spindle shaft and a workpiece actuator for specifying the position of the workpiece in relation to the tool. The spindle shaft is a directly or indirectly driven, precision-mounted shaft with integrated tool interface. The spindle shaft is an important assembly in many modern machine tools.

The axial actuator is provided according to the invention as an axial magnetic bearing, as a linear motor, or as a combination of an axial magnetic bearing and a linear motor. The linear motor can thus generate a macroscopic feed movement simultaneously with the microvibration, or the microvibration movement can be effected by an axial magnetic bearing. As a result the spindle shaft itself generates microvibration movements, and not just a tool receptacle at the end section of the spindle shaft in which a tool is carried. The high mass of the spindle shaft with connected tool can execute microvibration movements with a high impulse and corresponding effect on the machining. Reduced microvibration movements with an appropriate mass of the spindle shaft with connected tool system can accordingly provide high impulse exposure. According to the invention, the spindle shaft is magnetically mounted at least axially by means of an axial magnetic bearing, or can be moved axially by means of a linear motor. The radial bearings of the spindle shaft are implemented so that axial movements can be carried out, and can be designed as mechanical bearings with play for the vibration movements. Vibration impacts in the tool direction are in this way generated in the spindle shaft by an electrical drive of the axial magnetic bearing and/or of the linear motor, whereby the size of the chips created is directly affected. The electrical drive permits an adaptive adjustment of the microvibration movement, which can be adjusted depending on parameters of the chip-forming machining such as the type of material, rotation speed, feed rate etc. The axial movement direction corresponds to the direction of the axis of rotation of the spindle and of the tool.

The radial bearing of the spindle shaft can in principle be provided by mechanical bearings with adequate play for axial microvibration oscillations of the spindle shaft. Mechanical bearings, however, cause friction losses, and shorten the service life of the drive. In an advantageous further development, at least one radial bearing of the spindle shaft, preferably all the bearings, can be designed as liquid bearings and/or air bearings. A liquid bearing can, for example, be a hydrodynamic or hydrostatic sliding bearing, wherein an oil film is subjected to pressure by means of an external oil pump, whereby the two parts that are moving with respect to one another do not directly touch. Low-loss liquid friction prevails. An air bearing can be implemented as an aerostatic or aerodynamic bearing, in which the two mutually moving bearing partners are separated by a thin film of air. They therefore permit movement that is free from friction and free from stick-slip. These types of bearing permit, at least within limits, a practically friction-free axial movability without increased mechanical resistance or abrasion, so that they are advantageously suitable for radial bearing of the spindle shaft which is overlaid axially with microvibration movements. These types of bearing exhibit a slim, robust form, and can be integrated into tool drives without difficulty.

In an advantageous further development of the invention, at least one, preferably all the radial bearings are implemented as radial magnetic bearings which can be driven by the control and/or regulation apparatus to generate radial movements of the spindle shaft. Not only axial movements, but also radial movements, in particular microvibration movement for chip breaking and efficiency of the chip-forming machining method, can be generated in this way. Through the combination of the axial vibration movements with the radial shift in alignment, for example tilting or lateral displacement of the axis of rotation, an improved counterboring or a precision machining by means of a combination tool can, in particular, be achieved. An advantage of the magnetically mounted radial bearing for a combination with an axial vibration movement is that conventional roller bearings in machining spindles do not allow any axial oscillation, and a high level of abrasion, in particular at high speeds of rotation, is thus entailed.

In an advantageous development, the regulation and/or control apparatus can be configured to perform a controlled radial spindle movement through at least one radial magnetic bearing, so that a deburring of an opening of a drilled hole and/or a radial extension of a drill channel can be performed. Magnetically mounted spindle shafts offer the facility of moving the shaft at least slightly in a radial direction. This can, for example, be used for deburring drilled holes, in that after the drilling with a shaft whose rotation is centred, the workpiece and the spindle are at first moved with respect to one another in such a way that the cutting region of the drill is located almost entirely in the region of the hole to be deburred. In this position movement in the radial bearing along a circular track (through the specification of appropriate setpoint curves in both radial bearing planes, or only in the tool-side radial bearing plane) has the effect that the cutting of the tool wipes over the entire edge of the hole and removes the burr from there. Additional counterboring or deburring processes can in this way also be realized on the underside of the workpiece in an elegant manner.

With a suitable machining tool, deburring the edge of the outlet side of the hole is thus also possible.

The radial movability of the shaft of a magnetically mounted drilling spindle also allows an existing hole to be slightly milled out (e.g. using a milling tool that is smaller than the diameter of the hole), in that setpoint curves are specified for both radial bearing planes so that the axis of the shaft rotation describes a circular path.

A continuous transition between centred shaft rotation and shaft rotation with a movement of the rotation axis of the shaft along a circular path is appropriate both when deburring and when milling out a hole. In principle, conical or other non-circular hole geometries can be generated through shifting the position of the shaft axes.

In an advantageous development of the invention, two or more axial and/or radial bearings are provided in order to increase the adjustment forces. At least one axial bearing is thus fitted with at least one actuator, and possibly a plurality of actuators, to increase the force. The actuators can be driven sequentially in parallel or individually in order in total to increase the machining energy.

An aspect of the invention is an adaptation of the microvibration generation of the spindle shaft to varying chip-forming process parameters. For this purpose it is particularly advantageous for the regulation and/or control apparatus to comprise a memory unit and/or a function generation unit, and to be designed to specify setpoint values of the oscillation curve, in particular the frequency and amplitude of the microvibration movements, depending on geometrical and/or physical data of the workpiece and/or process variables that are measured or determined indirectly and/or control inputs. The geometrical structure of the workpiece, or the distributions of material or the material variations can be taken into account in the machining process, wherein changed microvibration movements are employed at particular workpiece positions and feed depths. A rotation speed, feed rate, feed force, energy consumption of the drive motor, torque of the spindle shaft, motor current, axial and/or radial spindle position or further process parameters can for example be employed for specification of the microvibration oscillation.

The setpoint curve for the axial position can be generated with the help of a table or through the superimposition of functions. The setpoint curve is, as a rule, a periodic function, apart from transitions when entering into the material or when changing layers in composite materials. The length of the period of this function can be chosen independently of the rotation speed of the spindle. A ratio of $1.5 = T\_rot/T\_excursion$ between the duration of the period of the spindle rotation $T\_rot$ and the duration of the period $T\_excursion$ of the axial position setpoint curve is helpful and technologically advantageous. The method is not, however, restricted to this ratio. A setpoint curve of the microvibration movement can have the following operating parameters, which are individually adjustable:

empirical profile specification;
regulation to max. current;
feed-forward or superposition control with a high-level feed control;
inclusion of the measured axial position of the spindle;
taking into account of static values (typical position for tool contact, knowledge of the workpiece structure and dimensions);

An important advantage of the proposed vibration drilling solution in comparison with the prior art is that the spindle shaft already executes the oscillation, and no further oscillation-generating element is necessary between the spindle shaft and the tool. In this way the following advantages over the prior art can be achieved:

compact system construction without the need to use an adapter for a series construction;
high precision (e.g. concentricity) since neither an adapter nor an extension are necessary;
standard tool holders, which are economical, can continue to be used;
simple tool exchange through the use of the standard tool holders of conventional spindles.

In the prior art, downstream, electrically acting active oscillation elements are employed, for which additional energy has to be introduced to the system (slip ring, inductive, . . . ). In the tool drive according to the invention, the energy is taken from the energy supply for the magnetically mounted drilling spindle, so that higher energy efficiency is achieved, and the expense and complexity of wiring and energy provision are saved.

An important advantage of the tool drive according to the invention is that the electrical current in the axial bearing is related to the axial force while drilling. As the force rises, so does the current. This permits the analysis and optimization of the drilling process without additional, expensive measuring equipment in order, for example, to carry out service life investigations (the force rises with increasing wear), or the development of tools or processes.

In one advantageous development, the means of feed control can be configured to recognize machining process variables such as placement on the workpiece surface and/or the penetration of a different material layer, and to specify setpoint values of the microvibration movement of the axial position control means.

In an advantageous development of the invention, the regulation and/or control apparatus can be configured to adjust the setpoint value of the oscillation curve of at least a partial movement section of the microvibration movements, and/or to switch off or on a microvibration movement in the machining process. Thus, through an adaptation of the shape of the curve, the tool engagement time can be affected, or appropriate influence can be had over the operating parameters for the supply of lubricant for clearing out the drilled hole. Spline-shaped or parabolic movement definitions which can transition to other movement curves continuously, and possibly with continuous differentials, are suitable.

An important advantage of the proposed vibration drilling solution in comparison with the prior art consists in the largely free parameterizability of the axial oscillation curve, as is required for different process parameters (in particular drilled hole diameter, material, speed of rotation and feed rate). In this way it is possible to vary the amplitude of the oscillation or to deactivate the oscillation. Through suitable, predefined axial position curves, the chip-forming process can be optimized, and the tool stress reduced. Through a suitable selection of the axial position curves, e.g. through a reduction of the axial speed at the entry point of the tool into the workpiece, both the required control currents and the resulting tool stress can be significantly reduced.

In particular, the proposed tool drive, and the machining method that can be performed with it, differ from the prior art through a largely free parameterizability of the oscillation form, oscillation frequency, amplitude, rotation speed of the tool, and the magnitude of the continuous drilling feed rate. The speed of entry into the material, and thus the stress on the tool, can be influenced through a suitable combination of these parameters. Through a reduction of the stress, it is, for example, possible to make use of potentially brittle cutting materials or of coatings such as, for example, diamond.

A deactivation is, for example, helpful during the final machining of a counterbore, so that the counterbore geometry does not exhibit an axial height profile.

A magnetic bearing regulation of the drilling spindle usually contains a control loop for the axial position (e.g. a PID controller or a state controller). The control group can advantageously be provided with feed-forward to improve the dynamic performance. It is in particular helpful to supplement the axial position controller with feed-forward. This axial position controller generates a setpoint current for a subsidiary current control loop. The movement of the spindle in an axial direction along the curve of the axial setpoint position is stabilized by the axial position controller and the axial current controller. In order to achieve axial position curves that are appropriate for drilling as effectively as possible, it is helpful to supplement the axial position controller with a current feed-forward control. The setpoint current of the axial bearing current controller is thus the sum of the current calculated by the axial position controller and the axial feed-forward current.

In an advantageous development, the regulation and/or control apparatus comprises an axial position control unit which advantageously exchanges data with an upstream means of feed control for generating the linear feed.

For the dynamic generation of the current setpoint values for the axial bearing elements, the regulation and control apparatus can be provided with various influencing values and parameters. In addition to typical process parameters such as axial setpoint position curves, material, hole diameter and the structure/geometry of the workpiece, measured values or indirectly determined state magnitudes such as the spindle rotation speed, actual axial position of the spindle, control currents of the axial bearing element, actual torque can be taken into account for determining the current setpoint values. In addition, switching processes such as switching off the microvibration or dynamic limits of the actuating variables can be initiated through control lines.

Various axial position curves, between which it is possible to switch according to the operating mode, can be stored in tables in the regulation and control apparatus.

Since the feed-forward current curves required are different for different process parameters (axial setpoint position curves, material, hole diameter, feed rate, rotation speed etc.), it is furthermore advantageous to adapt the feed-forward current curve adaptively. The deviation between the setpoint axial position and the actual position is evaluated for this adaptive adjustment. The fact that significant components of the feed-forward current signal are also periodic (with the period duration of the axial setpoint position curve T_excursion) is also exploited. The aim of the adaptation is to minimize the magnitude of the difference between the setpoint axial position and the actual axial position.

As a result of the drilling process, forces act on the shaft in an axial direction, and are opposed by the axial position controller through adjustment of the setpoint axial current. It is therefore possible to detect when the drill enters into the material through reference to the setpoint axial current or actual axial current. Layer transitions in composite materials can also be detected. This information can be used to adjust the parameters of the setpoint axial position oscillation. The information can also be passed on to the controller of the feed axis, in order to adjust the feed rate in dependency on the material. The information can also be used for adjusting the rotation speed of the spindle.

The adjustment of the parameters of the setpoint axial position oscillation can also be achieved through the controller of the feed axis or through a combination of control instructions and of the values determined from the axial current.

In an advantageous development, the feed control means and/or axial position control means can be configured to bring about a change in the parameters of the movement specification of the bearing through a continuous movement profile. It is helpful to arrange for a continuous transition between different parameter sets of the setpoint axial position oscillation.

The principle of axial magnetic bearings for the generation of microvibration movements, potentially in combination with axial air bearings, is that the functional principle is comparable with a directly driven linear motor.

The frequency of the oscillation depends primarily on the tool diameter, and also on the material. The axial and radial microvibration movement can be employed adaptively at given machining tasks, and dynamically changed in the machining process.

In an advantageous development, the regulation and/or control apparatus can be configured to generate microvibration movements between 1 Hz and 1 kHz, preferably between 5 Hz and 500 Hz, by means of the actuators, where a ratio of the tool rotation frequency to the microvibration frequency is adjustable, and preferably is in the range from 1 to 3, in particular 1.5 and/or a microvibration movement amplitude is settable between 0.01 mm and 1 mm, preferably between 0.01 mm and 0.5 mm. The vibration frequency is given by the ratio between the rotation frequency of the tool and the oscillations per rotation. The factor is variable, and can adopt a typical value of 1.5. The amplitude of the oscillation can be dependent on the tool diameter and the type of material.

The operating values and measured values of the magnetic bearing and the drive are advantageously linked together. Thus an increased torque requirement for spindles, e.g. an increased current in the drive regulator, can lead to the feed rate being reduced and the setpoint value curve of the microvibration movement adjusted, since the chip-forming process meets a harder material.

In an advantageous development, at least one magnetic prestressing apparatus, in particular a permanent magnet prestressing apparatus, can be provided in order to specify a force on the spindle shaft in a specifiable direction, in particular in the axial direction of the tool axis. Thus, as a construction measure, a permanent magnetic prestressing can be provided to reduce the power loss or for actively "pressing" against the workpiece, also if relevant for the generation of an "opposing pressure" to compensate the mass forces of the spindle.

For reduction of the power losses occurring in the magnetic bearing or in the rotor (e.g. caused by eddy current losses), the magnetic bearings can be implemented as unipolar bearings or also with permanent magnet prestressing.

It is also possible for the sensors, actuators and cabling to be potted in order to offer an improved protection and operating time for the vibration forces that occur.

Chip-forming machining generates a high thermal stress in the region of the tool at the axial end of the spindle shaft.

In an advantageous development, compressed air is passed through the spindle shaft and the tool so that it can blow the small chips arising during the drilling process out of the hole and has a cooling effect. Additives, such as oil or fine oil droplets, can be added to the compressed air for lubrication, in order, for example, to provide minimum quantity lubrication (MQL). Alternatively another gas can be used instead of the compressed air, in order to blow the chips out of the hole. Alternatively a liquid can be used instead of the compressed air, in order to flush the chips out of the hole.

In an advantageous development, the spindle shaft can comprise at least one coolant channel for a cooling and lubricating fluid, in particular a gaseous or liquid cooling and lubricating medium. The cooling and lubricating liquid can be passed from the stationary part of the tool drive via the spindle shaft to the chip-forming tool and can carry chips away as well as cooling the tool, whereby both the machining performance and the service life of the tool can be increased.

Advantageously a transfer point for the gaseous or liquid medium that can be fed into the spindle shaft can be implemented flexibly, so that axial or radial movements in the range from 0.01 mm up to 0.5 mm are possible for the spindle shaft. This can, for example, be realized through an elastic material or an elastic element similar to a bellows.

In an advantageous development, a tool holder, which is typically arranged at one axial end of the spindle shaft, is arranged at an angle to the spindle shaft through at least one angular deflection element, preferably an angle gear, angle gearbox or cardan joint, preferably at 90° to the axis of the spindle shaft. An angle gear or angle gearbox, a universal joint or a cardan joint can be used to join together two non-aligned shafts. In a universal joint, the deflection angle can be changed during the transfer of torque. The spindle shaft and the tool holder can be aligned at any desired angle, preferably at an angle of 90° to one another. A deflecting element, such as a cardan joint or an angle gearbox, can thus be incorporated between the spindle shaft and the tool holder, so that the axis of rotation of the spindle shaft and of the tool holder are angled. The use of a deflecting element of 90 degrees means that for an axial oscillation of the drilling tool, the oscillation can be generated in the radial magnetic bearing or in a further axial magnetic bearing engaging with the tool holder. Radial oscillations of the spindle shaft are converted into axial oscillations of the tool through the deflection. Axial impacts on the tool are transmitted as radial changes to the spindle shaft, so that a conversion of oscillation between the spindle shaft and the tool can be achieved. In this way a compact construction can be achieved, and existing machine tools can be retrofitted with a tool drive according to the invention.

In an advantageous development, a compensation oscillation generation apparatus can be comprised in the fixed part or in the moving part of the tool drive, being configured to compensate for oscillations of the spindle shaft in the tool drive. So that, in particular at high frequencies or at high accelerations, the spindle shaft transfers as little oscillation as possible into a feed slide or into the machine frame, it is possible in an advantageous development to compensate for the oscillation (at least partially) in that it is combined with an oscillation system running or aligned in the opposite direction. The actuator for the opposite-running oscillation system can, for example, be based on a piezoelectric or magnetic functioning principle. A compensation oscillation generation actuator can be subjected to oscillation signals that are reciprocal to those of the spindle shaft, or can compensate for a dynamic behaviour of the spindle shaft responsively on the basis of oscillation sensors using a control loop.

In an ancillary aspect according to the invention, an operating method is proposed by means of a tool drive as described above with magnetically mounted spindle shaft, wherein through at least one electromagnetic axial actuator as a magnetic bearing an adjustable axial microvibration movement of the spindle shaft is superimposed, independently of a feed, in order to influence the chip size and chip shape of the material removed from holes, in particular from deep drill holes.

Advantageously at least one axial magnetic bearing and/or one linear motor can be used as an axial actuator for generating axial microvibration movements. A combined use of both actuators can be advantageous to increase the force; the linear motor can also generate a macroscopic feed and an axial magnetic bearing can generate a vibration oscillation. The actuators can also be employed separately.

Advantageously within the scope of the proposed operating method of the tool drive, at least one radial magnetic bearing can be subjected to radial movements, in particular to microvibration movements. Through this the chip formation can be affected in further dimensions, and a radial guidance of the chip-forming tool achieved.

In an advantageous development, the spindle shaft can be guided radially by the radial magnetic bearing, in order to generate a controlled spindle movement for deburring a hole opening and/or a radial expansion of a drill channel. Further machining passes can thus be handled by the tool.

In an advantageous development, the control current for operation of the axial actuator, in particular of the magnetic bearings, can be limited to specifiable maximum values by a control and regulation loop within the control and regulation apparatus. Damage to the tool drive is prevented by this.

In an advantageous development, the setpoint oscillation curve of the microvibration movement, in particular the amplitude and frequency of the microvibration movement, can be chosen depending on directly or indirectly determinable drilling parameters, and adjusted during the drilling process. An adaptive generation of the microvibration movements is possible through this.

In an advantageous development, changes in the directly or indirectly determinable drilling parameters and/or parameters of the setpoint curve of the microvibration movement generation can be evaluated with respect to a wear of the tool. Thus an increased energy consumption with otherwise identical drilling parameters, an increase in the vibration movement, increased torque or other process parameters that are collected for control of the microvibration movement can be used with respect to an abrasion and wear or defect of the tool, in order to achieve an improved monitoring, increased failure security and cost reduction of the chip-forming machining, in particular within the framework of series manufacture.

In an advantageous development, the control and regulation apparatus can limit the process forces that arise, in particular the contact pressure, feed force, speed of rotation and/or torque of the tool to specifiable maximum values. Wear can thus be detected, and damage to and overheating of the tool can be avoided.

In an advantageous development, a setpoint curve of the microvibration movement at or before the tool meets the workpiece can specify a lower feed rate. The tool can here be braked before contacting the surface of the workpiece, and an impact pulse reduced, so that the cutting edges of the tool are protected and the service life increased. D In an advantageous development, the spindle shaft axis can be deflected eccentrically to the spindle shaft axis to compensate for imbalances. This can preferably be useful at higher rotation speeds, in particular in the range above about 800 rpm, so that imbalances and vibrations can be suppressed, and also so that eccentrically stressing working processes, such as chamfering processes and so forth, can be carried out.

In the event that the tool system is overstressed, or is subjected to unwanted impacts, or in the presence of resonant mechanical oscillation, a collision, i.e. mechanical contact between the spindle shaft and the surrounding of the magnetic bearing, can result. This can lead to damage to or destruction of the bearings or the spindle shaft of fast-rotating drives. In an advantageous development of the operating method, unwanted collisions of the tool can be detected by means of magnetic bearing position sensors comprised in the regulation and/or control apparatus, and measures to rectify the collision state can be introduced. Collision protection can advantageously be implemented easily: Before a possible collision, there is no direct contact owing to the air gap in the axial or radial magnetic bearings. The deflection of the spindle shaft can be measured by a high-level position sensing system using sensors, and a collision can be detected in good time and prevented. A rotation frequency, torque or feed rate of the spindle shaft can, for example, be reduced, increased or switched off for this purpose in order to prevent a tendency for collision.

BRIEF DESCRIPTION OF THE DRAWINGS

Further advantages emerge from the description of the drawings below. The drawing shows exemplary embodiments of the invention. The drawing, description and the claims contain numerous features in combination. The expert will expediently also consider the features individually and combine them into useful further combinations.

Here.

DETAILED DESCRIPTION

The same reference codes have been used to identify components that are identical or similar type in the figures.

Figure 1:
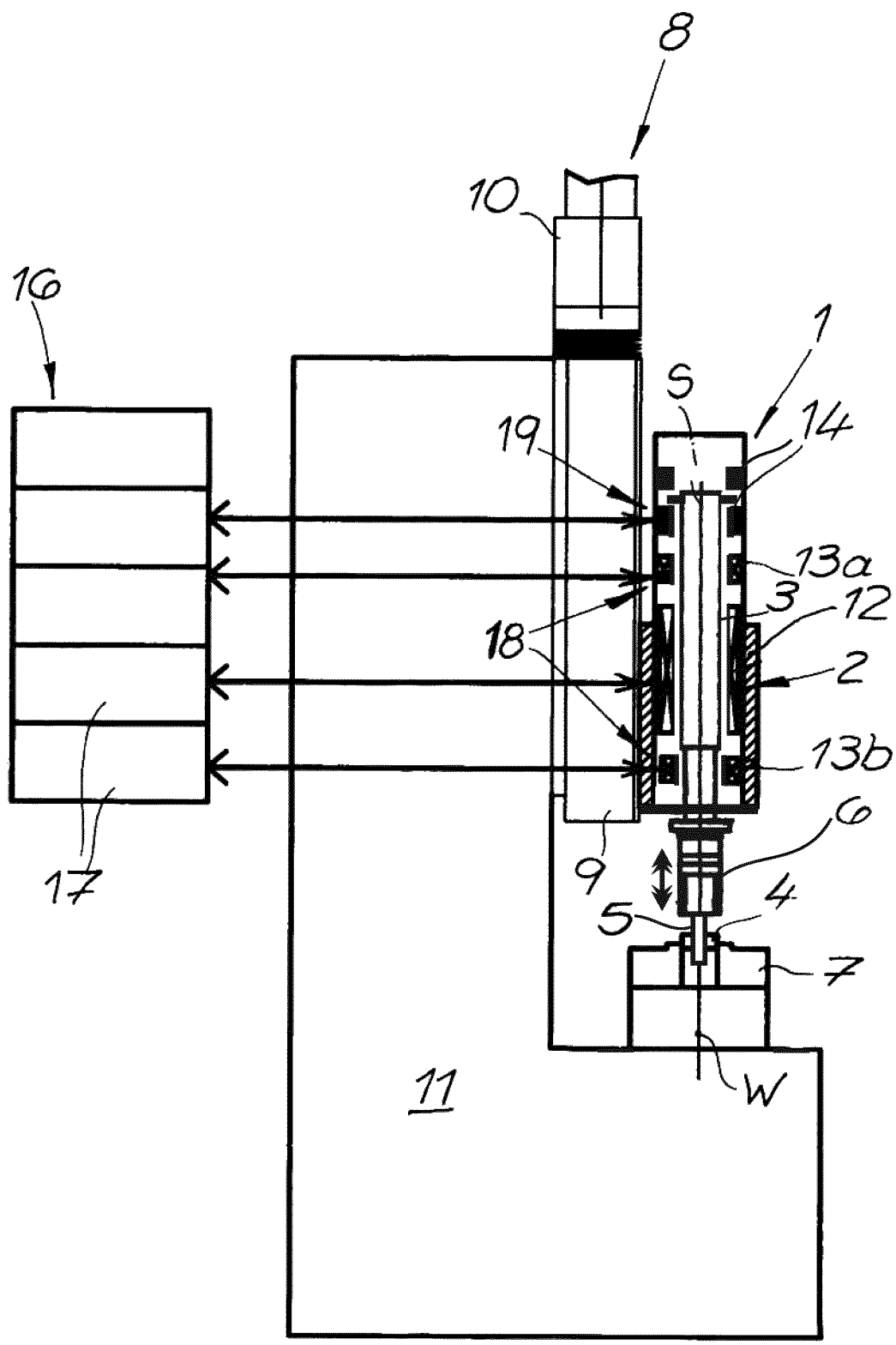
FIG. 1 shows a first exemplary embodiment of a tool drive with a spindle shaft on magnetic bearings according to the invention.
Figure 2:
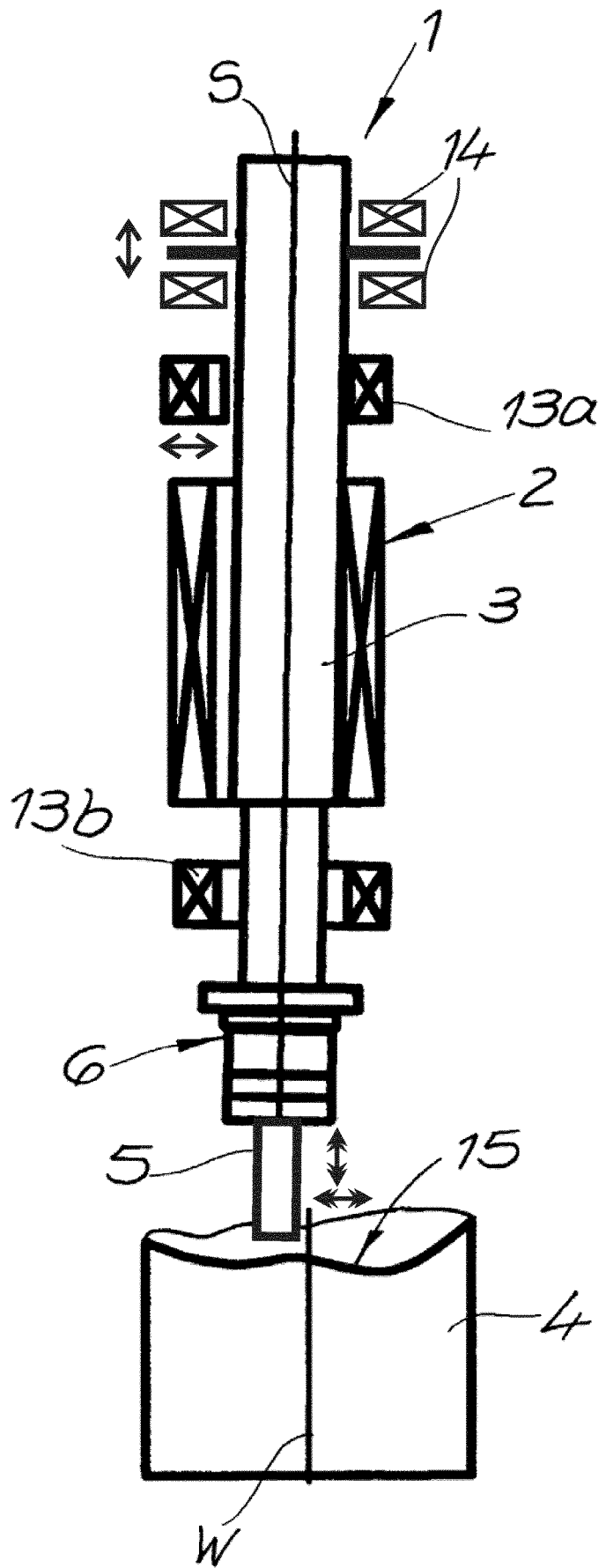
FIG. 2 shows a second exemplary embodiment of a tool drive with a spindle shaft on magnetic bearings according to the invention.

FIGS. 1 and 2 each show an apparatus for hole machining in workpieces, in particular in metal, plastic or composite workpieces according to forms of embodiment of the invention.

As shown in FIG. 1, the fundamental structure of such an apparatus comprises a tool drive 1 with a spindle shaft 3 that can be driven to rotate by a spindle drive 2, to which a tool 5 that works on the workpiece 4 is fastened. The tool 5 is fastened by a tool holder 6 to the spindle shaft 3, and rotates around the spindle axis S or tool axis. The tool 4 is fastened to a workpiece receptacle 7 or workpiece holder, and can, if appropriate, also rotate around the workpiece axis W. A mechanical feed apparatus 8 for the tool drive 1 is furthermore provided in the exemplary embodiment according to FIG. 1. The feed apparatus 8 (or advance unit) comprises a feed slide 9 or advance slide which is movable by means of a feed drive 10 or advance drive at a machine frame 11. The tool drive 1 is arranged fixedly on the feed slide 9 by means of a spindle holder 12.

The spindle shaft 3 is mounted in the tool drive 1 in at least two radial bearings 13a, 13b and in at least one axial bearing 14 in five axial directions. The axial bearing 14 comprises two annular coil magnets which are arranged in opposition to a slide anchor which is arranged non-rotatably about the spindle shaft, by means of which a shift of the shaft in an axial direction is possible. An upper and a lower, or a rear and front, radial bearing 13a, 13b are furthermore provided, the spindle drive 2 being arranged between these two radial bearings 13a, 13b. The spindle drive 2 in the exemplary embodiment is a multi-pole asynchronous motor.

Both the radial bearings 13a, b and the axial bearing 14 are designed as magnetic bearings. The bearing parts of these magnetic bearings are held without contact, with an air gap, by magnetic forces, the magnetic forces being generated and adjusted by electromagnets. This allows the spindle axis S to be moved within certain limits and adjusted in the radial direction in the radial bearings 13a, 13b and in the axial direction in the axial bearing 14.

FIG. 1 additionally shows that the exemplary embodiment comprises a control or regulation apparatus 16 which is connected with the two radial bearings 13a, b and with the axial bearing 14 and the spindle drive 2. With the aid of the control and/or regulation unit 16, which comprises a plurality of regulation modules 17, the radial displacement V and the adjustment angle can initially be dynamically and changeably adjusted. At least one measuring transducer 18, 19 is assigned to each of the radial bearings 13a, 13b and the axial bearing 14, where the measuring transducer 18 is preferably integrated into the magnetic bearings 13a, b, 14. The control and/or regulation apparatus 16 affects the axial bearing 14 as well as the two radial bearings 13a, b in such a way that vibration movements in the direction of the longitudinal axis as well as in the radial direction can actively be applied in a controlled manner with adjustable frequency and amplitude, in order to achieve desired chip sizes and chip shapes, to minimize the heat development, to increase the service life and to shorten drilling times.

Since not only the radial bearings 13a, 13b but also the axial bearing 14 are designed as magnetic bearings, it is possible in the context of the invention for the position of the spindle shaft 3 in an axial direction also to be adjustable within the tool drive 1 by means of the axial bearing 14. This is achieved through exact adjustment of the magnetic gap within the axial bearing 14 and the modulation of an adjustable vibration movement, so that the advance movement or feed movement can be made within certain limits through the drive to the axial bearing 14. In this way an axial advance of the tool 5 is initially achieved in very small steps, independently of the feed apparatus 8, which is driven by an electric motor and which may additionally be present, which can provide a coarse adjustment of the axial position and moves the entire tool drive 1. The feed distance, feed velocity and, in particular, the feed force or pressing force of the tool 5 against the workpiece 4, can be influenced through the magnetic axial bearing 14.

Taking the integrated measuring transducers 19 into account, a force-controlled or a force-and-displacement-controlled chip-forming machining with modulation of microvibration movements is achieved. The measured values determined via the bearings permit conclusions to be drawn about the condition of the tool 5 and regarding any possible tool fracture, so that here again a simple and reliable monitoring can take place without separate measuring transducers having to be employed.

The control/regulation apparatus 16 can be designed as an Industry PC, or as part of an Industry PC which is connected to the measurement transducers 18, 19. This PC converts the current values measured in the bearings by the transducers 18 and/or 19 into force values which are passed on to a displacement controller so that a combined force-displacement-control/regulation can take place in the machining, and the vibration movement can be adjusted to currently present drilling conditions.

A modified form of embodiment of the invention is explained with reference to FIG. 2. This shows the drilling at a free-form surface with a tool 5 with coated cutting material for high precision surface machining, for example a diamond stylus. Since the tool 5 is freely and fully automatically positionable within certain limits axially and radially by means of the spindle 3 with the help of the magnetic radial bearings 13a, b and the axial magnetic bearing 14, it is possible, through electronic drive of the bearings 13a, 13b, 14 through the control or regulation apparatus to ensure a precise positioning of the tool taking into account the free-form surface that is to be created or to be machined. A free-form surface that has already been formed can here be adaptively machined using chip-forming machining by means of a force control system. It is, however, also possible for the free-form surface to be machined or generated with material removal, taking into account values that have previously been precisely calculated and entered into the control or regulation apparatus.

Figure 3:
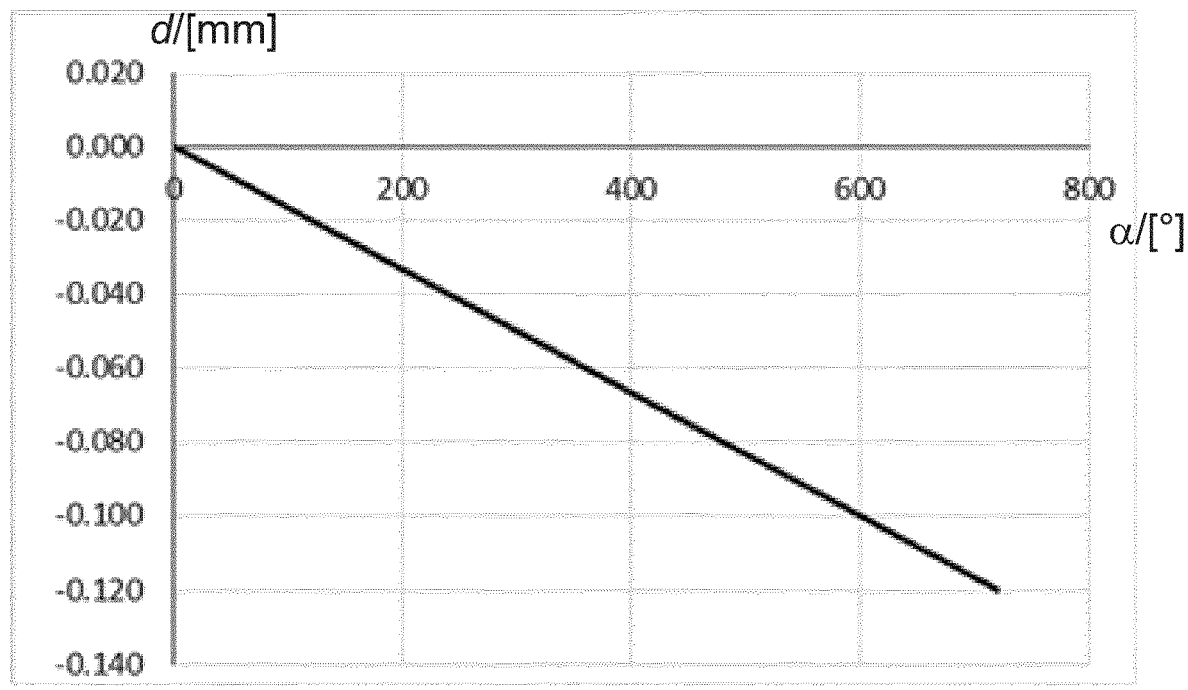
FIG. 3 shows a diagram of a macroscopic feed of a spindle shaft.

A desired continuous tool feed of a drilling tool is illustrated in FIG. 3, wherein the angle of rotation of the tool is displayed in degrees [°] on the abscissa, and the ordinate shows a penetration depth in [mm]. The aim is to achieve a desired feed of 0.06 mm per rotation of the drilling tool.

Figure 4:
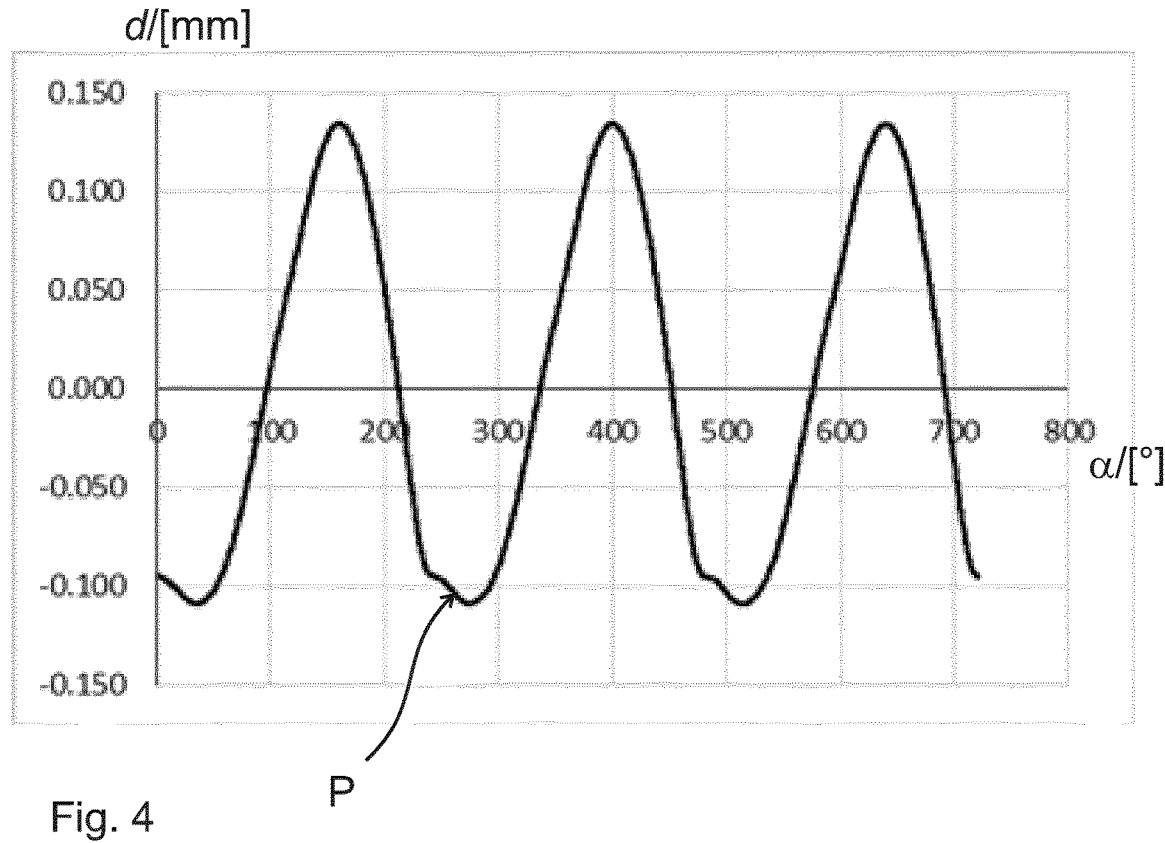
FIG. 4 shows a diagram of an axial microvibration superposition of a spindle shaft according to the invention.

Corresponding to this, FIG. 4 shows a setpoint value curve of an axial vibration movement in the drilling direction which the drilling tool performs in one embodiment of the invention, where a stroke amplitude of the drilling tool of 0.13 mm at a stroke frequency of 1.5 Hz should be achieved. In the lower region of the stroke in the section P of the setpoint value curve, the cutter of the drilling tool touches the drilling ground and thus the surface of the workpiece. In the region of the section P of the setpoint value curve, the axial speed can be influenced in such a way that a tool head contacts a workpiece surface gently, whereby an impact pulse is reduced and the service life of the tool can be increased. The setpoint value curve in the region of the section P can be adjusted taking predetermined material parameters and process parameters into account. The setpoint value curve of the vibration oscillation can be adapted dynamically to the drilling process.

Figure 5:
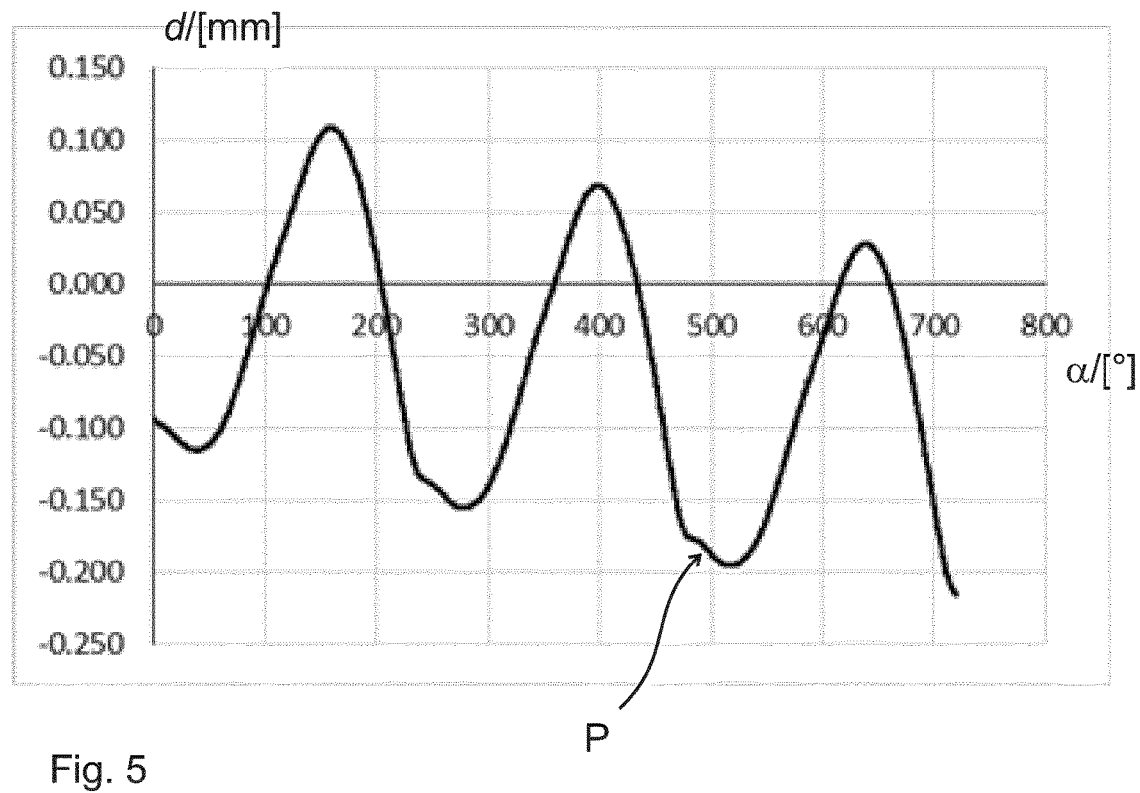
FIG. 5 shows a superposition diagram of the macroscopic and microscopic movements of FIG. 3 and FIG. 4.
Figure 6:
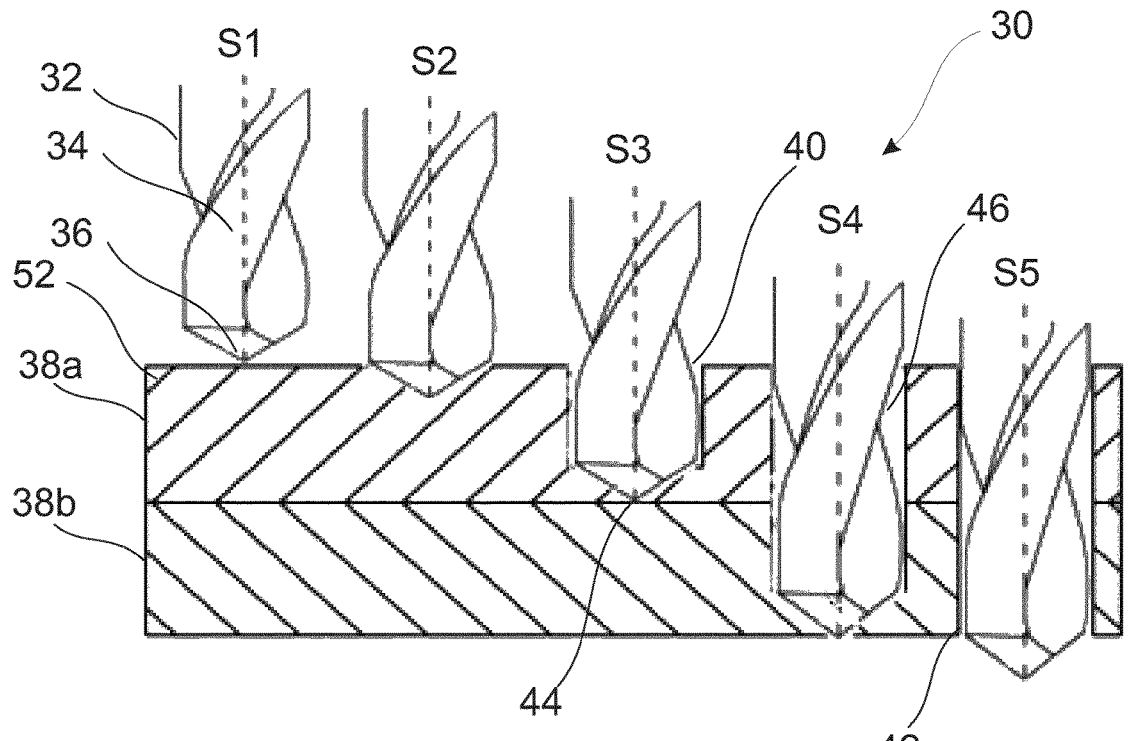
FIG. 6 shows a schematic illustration of individual drilling process steps when drilling through a composite workpiece with a form of embodiment of the invention.

In sequence, FIG. 5 shows an overlaid setpoint value curve of the continuous feed according to FIG. 3, and an optimized vibration oscillation movement according to FIG. 4, whereby a continuous feed and an axial oscillation of the position of the cutting edge along the longitudinal axis is achieved, so that, in particular when deep drilling, easily removable drilling chips can be achieved, heat development reduced, service life increased and machining time shortened. The section P that is drawn in shows the contact of the drilling tool with the drilling ground at which tool engagement with the workpiece begins and the formation of chips with a reduced, adjustable feed starts. FIG. 6 shows a through-hole 30 in a composite workpiece 38 with an upper, metal applied layer 38a and a lower carbon fibre composite layer 38b, as is used, for example, on a wing of an aircraft. In step S1 the drilling tool 32, which is rotating around the axis 34, makes contact with the cutting tip 36 on the surface of the metal layer 38a in order to form an inlet opening 40. In the further steps S2 and S3 the drilling tool 32 drills, overlaid with vibration movements on the longitudinal axis, as far as the boundary surface 44 between the metal layer 38a and 38b. Since the cutting process and the chip formation is changed in the lower composite layer 38b, the frequency and amplitude of the vibration oscillation can be changed, for example the amplitude increased and the frequency reduced, and thereby an increased feed rate can be achieved with a chip size and chip shape that remain the same. Reaching or passing through the layer boundary 44 can be detected indirectly through a change in the energy consumption or a change in the dynamic behaviour, e.g. the torque or feed rate, of the drilling tool 32, or, if the geometry is known in advance, detected by reaching a predetermined penetration depth into the hole 30, so that the overlaid vibration movement can be adjusted. The second layer of material 38b is drilled through in steps S4 to S5, until a lower outlet opening 42 is created, through which the drilling tip 36 emerges through the drill channel 46.

Figure 7:
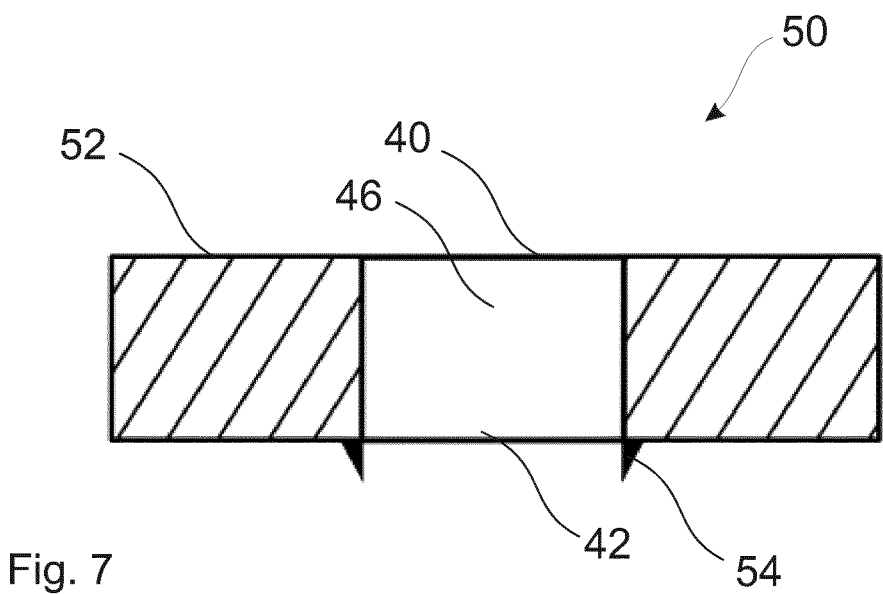
FIG. 7 shows a schematic illustration of a burr formation of a through-hole.

FIG. 7 illustrates a drill channel 46 of a through-hole 50 through a workpiece 52. As a rule, both the inlet opening 40 and the outlet opening 42 have drilling burrs 54 which result from the displacement of material. Burrs 54 are unwanted, since in the bonding process they lead to unwanted spacings, present a risk of injury, and, for example, impair aerodynamic functions. The burrs that are formed are usually removed subsequently by deburring tools. Through a drilling process according to the invention, with appropriate adaptation of the vibration movements when creating the inlet and outlet openings 40, 42 of the through-hole 46, the burr formation can be significantly reduced, so that a rework becomes unnecessary, or only has to be carried out to a small extent.

Figure 8:
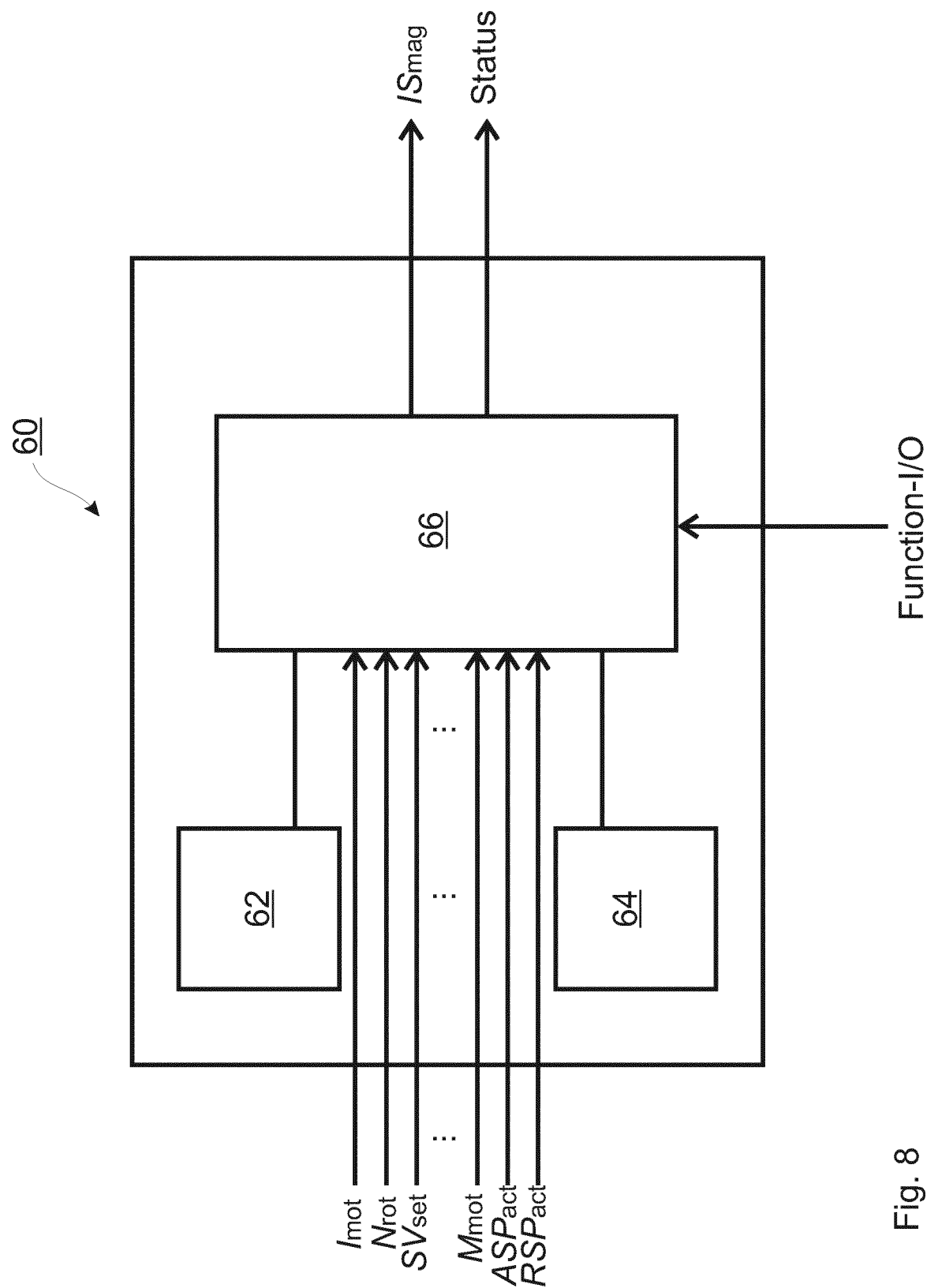
FIG. 8 shows a block circuit diagram of a form of embodiment of the control and/or regulation apparatus of the invention.

FIG. 8 shows a block circuit diagram of a form of embodiment of a regulation and control apparatus 60 which can be employed in a tool drive 1 according to the invention for drive of an electromagnetic axial actuator of a spindle shaft 3 for driving a rotating tool 5, 32 such as a drilling or milling machine. The apparatus 60 can be integrated into an axial actuator regulator. The control and/or regulation apparatus 60 comprises a microvibration regulation unit 62 which can be designed as a programmable actuator processor system. A memory unit 62 which stores a large number of setpoint value curves of a microvibration oscillation as well as managed macroscopic profiles for different drilling processes, for example for different materials, composite materials, deep drilling processes, milling processes etc. is attached to the regulation unit 66. A memory unit 64 for operating parameters and actual value curves, which records changes in operating parameters and stores actual value curves of the vibration oscillation, is also connected to the regulation unit 66, so that a wear condition of the tool 5, 32 can be determined from changes to the parameters and/or the actual value curves. In this way, direct and indirect drilling parameters such as, for example, motor current $I_{mot}$, tool rotation speed $N_{rot}$, setpoint feed rate $SV_{set}$, tool torque $M_{mot}$, actual axial spindle position $ASP_{act}$ and actual radial spindle position $RSP_{act}$ can be stored directly through sensors or indirectly through derived values. The regulation unit 66 supplies one or more control currents $IS_{mag}$ for drive of the axial actuator or actuators, and, if relevant, of the radial actuator or actuators, and in addition can pass on status information to a higher-order machine-tool controller. In addition, one or a plurality of function inputs and outputs for input of external programming and adjustment of the behaviour of the microvibration regulator, and to be able to read parameters out, can be present at the control and/or regulation unit.

Figure 9:
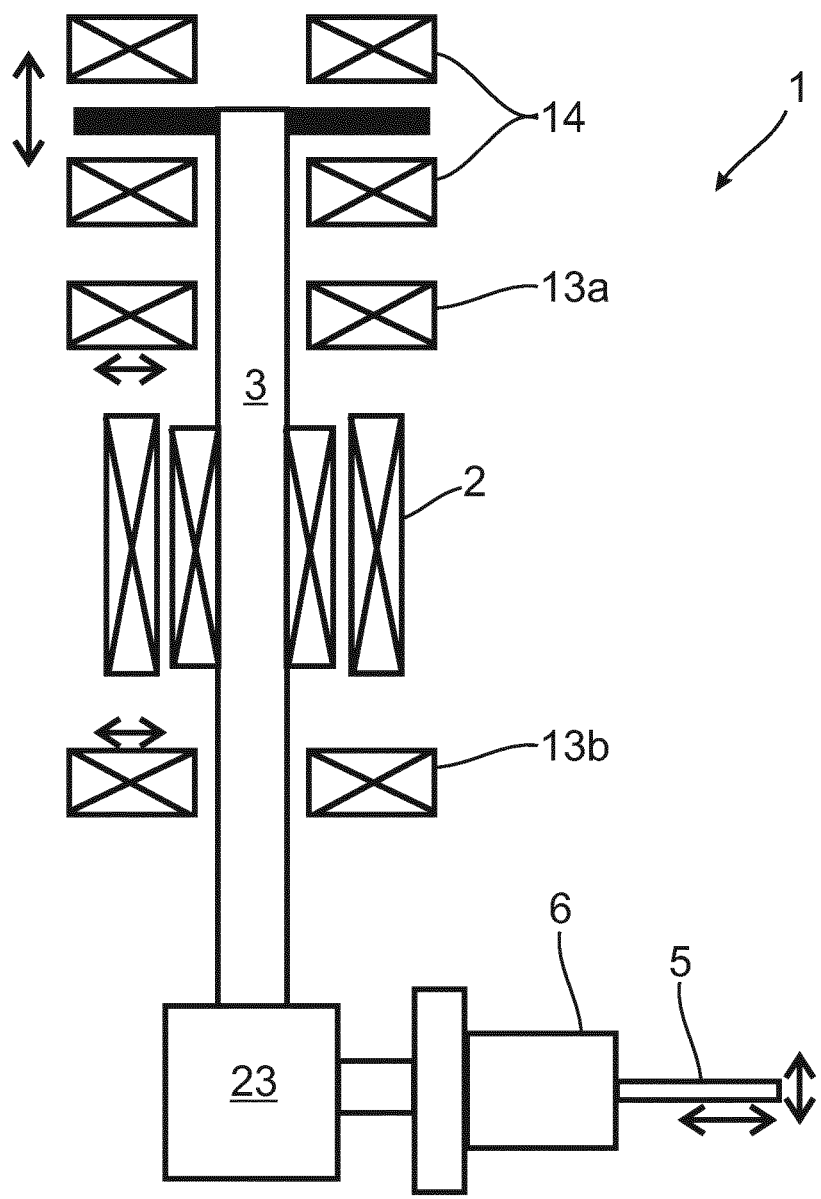
FIG. 9 shows a further exemplary embodiment of a tool drive with a spindle shaft on magnetic bearings according to the invention.

A further exemplary embodiment of a tool drive 1 according to the invention is illustrated in FIG. 9, with a spindle shaft 3, a tool holder 6 and a chip-forming tool 5. The spindle shaft 3 is fundamentally constructed according to the embodiment in FIG. 2. Deviating from that, at the axial end of the spindle shaft 3, the tool holder 6 with the tool 5 is not connected non-rotatably in the direction of the longitudinal axis to the spindle shaft 3, but rather the rotational axis of the tool holder 6 is pivoted by means of an angular deflector 23, for example an angular gear, through 90° with respect to the rotational axis of the spindle shaft 3. A kinematic interchange of the axial and radial movements of the spindle shaft 3 with respect to the radial and axial movement of the tool 5 results from this. An axial movement of the tool 5 can be generated by the radial magnetic bearings 13 of the spindle shaft, and a radial deflection of the tool 5 can be achieved through the axial magnetic bearing 14 and also through the radial magnetic bearings 13. The use of the angular deflection element 23 reduces the structural size of the tool drive 1, so that it can, for example, be retrofitted in the machine base of a machine tool. It is also possible in this exemplary embodiment, if a radial movability of the tool 5, at least in one direction, is not required, for the axial magnetic bearing 14 to be omitted.

LIST OF REFERENCE SIGNS

1 Tool drive
2 Spindle drive
3 Spindle shaft
4 Workpiece
5 Chip-forming tool
6 Tool holder/tool chuck
7 Workpiece holder
8 Mechanical feed apparatus
9 Feed slide
10 Feed drive
11 Machine frame
12 Spindle holder
13 Radial magnetic bearing
14 Axial magnetic bearing
15
16 Control and/or regulation apparatus
17 Control module
18 Measuring transducer
19 Measuring transducer
30 Through-hole
32 Drilling tool
34 Tool axis
36 Cutting tip
38 Material layer
40 Inlet opening
42 Outlet opening
44 Material layer boundary surface
46 Drill channel
50 Through-hole
52 Workpiece
54 Burr
60 Regulation and/or control apparatus
62 Setpoint value curve memory unit
64 Operating parameters and actual value curve memory unit
66 Microvibration control unit

The invention claimed is:

1. Tool drive with spindle shaft for a chip-forming machining, comprising at least one electromagnetic axial actuator and a control and/or regulation apparatus for the operation of the at least one axial actuator for changing the position of the spindle shaft along the longitudinal axis, wherein the control and/or regulation apparatus is designed to drive the at least one axial actuator for the generation of microvibration movement of the spindle shaft, independently of and superimposable on a feed movement, in order to affect chip size and chip shape of removed material created when drilling, wherein at least one axial magnetic bearing and/or one linear motor is provided as at least part of the at least one axial actuator, wherein the control and/or regulation apparatus comprises a memory unit and/or a function generation unit, and is configured to specify setpoint values of the oscillation curve of the microvibration movement depending on geometrical and/or physical data of the workpiece and/or process variables that are measured or determined indirectly and/or control inputs, so that the control and/or regulation apparatus is configured to adjust an axial microvibration movement of the spindle shaft, independently of and superimposed on a feed movement, in such a way as to affect the chip size and chip shape of the removed material created when drilling by adjusting the setpoint value of the oscillation curve of a partial movement section of the microvibration movements at or before the tool contacts the surface of the workpiece to provide a lower feed rate when contacting the workpiece's surface.

2. Tool drive according to claim 1, wherein at least one radial bearing of the spindle shaft are implemented as liquid bearings and/or air bearings.

3. Tool drive according to claim 1, wherein at least one radial bearing of the spindle shaft are radial magnetic bearings which are driveable by the control and/or regulation apparatus for the generation of radial movements.

4. Tool drive according to claim 3, wherein the control and/or regulation apparatus is configured to perform a controlled radial spindle movement through at least one radial magnetic bearing, so that a deburring of an opening of a drilled hole (40, 42) and/or a radial extension of a drill channel can be performed.

5. Tool drive according to claim 1, wherein two or more actuators are provided for the increase of displacement forces.

6. Tool drive according to claim 1, wherein the control and/or regulation apparatus is configured to detect machining process values such as including the placement on the workpiece surface and/or the penetration of a different material boundary layer and to adjust setpoint values of the microvibration movement.

7. Tool drive according to claim 1, wherein the control and/or regulation apparatus is configured to switch off or on a microvibration movement in the machining process.

8. Tool drive according to claim 1, wherein the control and/or regulation apparatus is configured to bring about a change in the setpoint value of the oscillation curve for the movement specification by means of the at least one axial actuator.

9. Tool drive according to claim 1, wherein the control and/or regulation apparatus is configured to exchange data with a feed control means and/or with a rotation speed control means.

10. Tool drive according to claim 1, wherein the control and/or regulation apparatus is configured to generate microvibration movements between 1 Hz and 1 kHz by means of the actuators, where a ratio between the tool rotation frequency and the microvibration frequency is adjustable and/or a microvibration movement amplitude is settable between 0.01 mm and 1 mm.

11. Tool drive according to claim 1, wherein at least one magnetic prestressing apparatus is provided in order to specify a force on the spindle shaft in a specifiable direction.

12. Tool drive according to claim 1, wherein the spindle shaft comprises at least one coolant channel for a cooling and lubricating fluid, wherein a transfer region for a gaseous or liquid cooling and lubricating medium is implemented in at least one coolant channel of the spindle shaft elastically.

13. Tool drive according to claim 1, wherein a tool holder is arranged at an angle to the spindle shaft through at least one angular deflection element.

14. Tool drive according to claim 1, wherein a compensation oscillation generation apparatus is comprised in the tool drive, and is configured to compensate for oscillations of the spindle shaft in the tool drive.

* * * * *